(12) United States Patent
Pfaff

(10) Patent No.: US 8,322,778 B1
(45) Date of Patent: Dec. 4, 2012

(54) AERODYNAMIC DRAG REDUCTION DEVICE FOR A TRAILER

(76) Inventor: Raimund Pfaff, Carter Lake, IA (US)

( * ) Notice: Subject to any disclaimer, the term of this patent is extended or adjusted under 35 U.S.C. 154(b) by 0 days.

(21) Appl. No.: 13/246,127

(22) Filed: Sep. 27, 2011

(51) Int. Cl.
  *B62D 35/00* (2006.01)
(52) U.S. Cl. .................................................. 296/180.4
(58) Field of Classification Search ............... 296/180.1, 296/180.2, 180.4, 181.5; 180/903
  See application file for complete search history.

(56) References Cited

U.S. PATENT DOCUMENTS

| | | | | |
|---|---|---|---|---|
| 4,629,241 A * | 12/1986 | Gruich | ..................... | 296/180.2 |
| 4,640,541 A * | 2/1987 | FitzGerald et al. | ........ | 296/180.1 |
| 5,280,990 A * | 1/1994 | Rinard | ..................... | 296/180.1 |
| 6,974,178 B2 | 12/2005 | Ortega et al. | | |
| 7,093,889 B2 * | 8/2006 | Graham | ..................... | 296/180.4 |
| 7,578,541 B2 * | 8/2009 | Layfield et al. | ........... | 296/180.2 |
| 7,762,615 B2 * | 7/2010 | Dayton | ..................... | 296/180.1 |
| 7,780,224 B2 * | 8/2010 | Roush | ..................... | 296/180.4 |
| 7,789,453 B2 * | 9/2010 | Roush et al. | ............... | 296/180.1 |
| 7,806,464 B2 * | 10/2010 | Cardolle | ................... | 296/180.4 |
| 7,828,368 B2 * | 11/2010 | Ortega et al. | ............. | 296/181.5 |
| 7,854,469 B2 * | 12/2010 | Dayton | ..................... | 296/180.4 |
| 7,992,923 B2 * | 8/2011 | Dayton | ..................... | 296/180.4 |
| 2005/0146161 A1* | 7/2005 | Uland | ..................... | 296/180.1 |
| 2008/0303309 A1* | 12/2008 | Dayton | ..................... | 296/180.1 |
| 2011/0068605 A1* | 3/2011 | Domo et al. | ............... | 296/180.4 |

* cited by examiner

*Primary Examiner* — Glenn Dayoan
*Assistant Examiner* — Gregory Blankenship
(74) *Attorney, Agent, or Firm* — Dennis L. Thomte; Thomte Patent Law Office LLC

(57) ABSTRACT

A drag reduction device for a trailer comprising a generally U-shaped upstanding wall means having a floor secured to the lower end thereof. The device is secured to the underside of the trailer so that the rearward end of the device is positioned just forwardly of the forward end of the rear wheel assembly of the trailer. In one embodiment, the device is coupled to the slider axle of the trailer so that the device is moved forwardly and rearwardly with the slider axle.

2 Claims, 5 Drawing Sheets

US 8,322,778 B1

AERODYNAMIC DRAG REDUCTION DEVICE FOR A TRAILER

BACKGROUND OF THE INVENTION

1. Field of the Invention

This invention relates to an aerodynamic drag reduction device for a trailer and more particularly to an aerodynamic drag reduction device which is positioned at the underside of the trailer forwardly of the rear wheel assembly to reduce air flow impingement on the rear wheel assembly.

2. Description of the Related Art

Typical semi-trailers include a body having a forward end, a rearward end, a first side, a second side and a rear wheel assembly at the underside of the body. As the trailer moves along a highway, air flow impinges on the wheels, axle and suspension system of the rear wheel assembly to create an aerodynamic drag which adversely affects the fuel consumption of the truck or tractor pulling the trailer.

Drag reduction devices have been previously provided which attempt to reduce the aerodynamic drag on the rear wheel assembly of trailers. For example, in U.S. Pat. No. 6,974,178, various drag reduction devices are disclosed which attempt to reduce the aerodynamic drag on the rear wheel assembly of a trailer. Although the drag reduction of U.S. Pat. No. 6,974,178 may reduce the aerodynamic drag on the rear wheel assembly of a trailer to some degree, improvements thereof are necessary to further reduce the aerodynamic drag on the rear wheel assembly. The instant invention has been proven to substantially reduce the aerodynamic drag of such trailers.

Additionally, to the best of Applicant's knowledge, the aerodynamic drag reduction devices of the prior art do not perform satisfactorily when the trailer rear wheel assembly is of the sliding axle type.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

An apparatus is provided for reducing the aerodynamic drag of a trailer having a body with a forward end, a rearward end, opposite sides, an underside and a rear wheel assembly supporting the body from the underside thereof. The drag reduction device of this invention includes a generally U-shaped upstanding air deflector wall means having a forward end and a rearward end. The wall means includes a first side portion having a rearward end, a forward end, an upper end and a lower end. The first side wall portion of the wall means extends forwardly and inwardly in a generally curved manner from its rearward end to its forward end. The wall means includes a second side wall portion having a rearward end, a forward end, an upper end and a lower end. The second side wall portion of the wall means extends forwardly and inwardly in a generally curved manner from its rearward end to its forward end. The forward ends of the first and second wall portions are joined together to form a round nose portion. A horizontally extending floor, having forward and rearward ends, is secured to the lower ends of the first and second side wall portions and extends therebetween.

The device of this invention is positioned beneath the underside of the trailer so that the rearward ends of the first and second side wall portions of the wall means are positioned adjacent the forward end of the rear wheel assembly whereby air flow impinging on the wall means will be deflected outwardly of the rear wheel assembly. In the preferred embodiment, the floor includes portions thereof which extend outwardly from the first and second side wall portions and the nose portion of the wall means.

If the trailer includes a sliding axle, the device of this invention is operatively secured to the sliding axle for longitudinal movement therewith.

The apparatus of this invention may also include side shield assemblies which are operatively secured to the trailer which extend rearwardly from the rearward ends of the first and second side wall portions of the wall means.

It is a principal object of the invention to provide an aerodynamic drag reduction device for a trailer.

A further object of the invention is to provide an aerodynamic drag reduction device for a trailer which is positioned at the underside of the trailer forwardly of the rear wheel assembly thereof to prevent air from impinging on the rear wheel assembly of the trailer.

A further object of the invention is to provide an aerodynamic drag reduction device for a trailer which is positioned at the underside of the trailer and which is operatively secured to the sliding axle of the trailer for longitudinal movement therewith.

A further object of the invention is to provide an aerodynamic drag reduction device for a trailer which is generally U-shaped and which includes a floor with the floor having portions thereof which extend outwardly from the forward end and sides of the device.

A further object of the invention is to provide an aerodynamic drag reduction device for a trailer which may be retrofitted onto existing trailers.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention.

However, embodiments may be implemented in many different forms and should not be construed as being limited to the embodiments set forth herein. The following detailed description is, therefore, not to be taken in a limiting sense in that the scope of the present invention is defined only by the appended claims.

Figure 4:
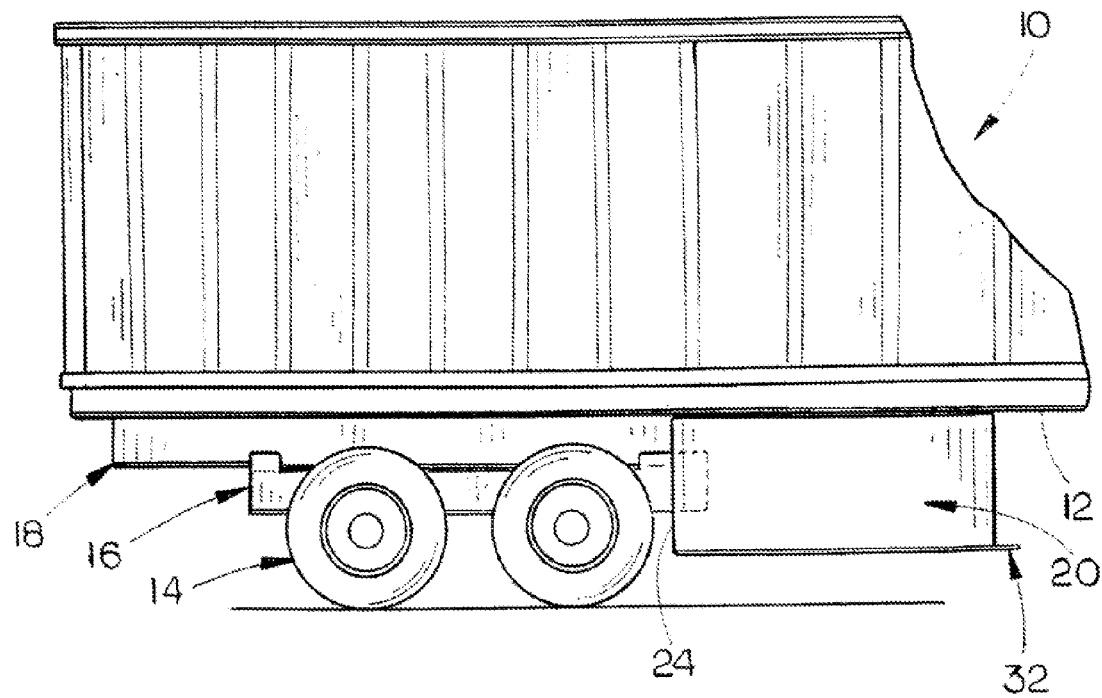
FIG. 4 is a partial view of a trailer having a slider axle mounted thereon with the slider axle and the drag reduction device in its forward position.
Figure 5:
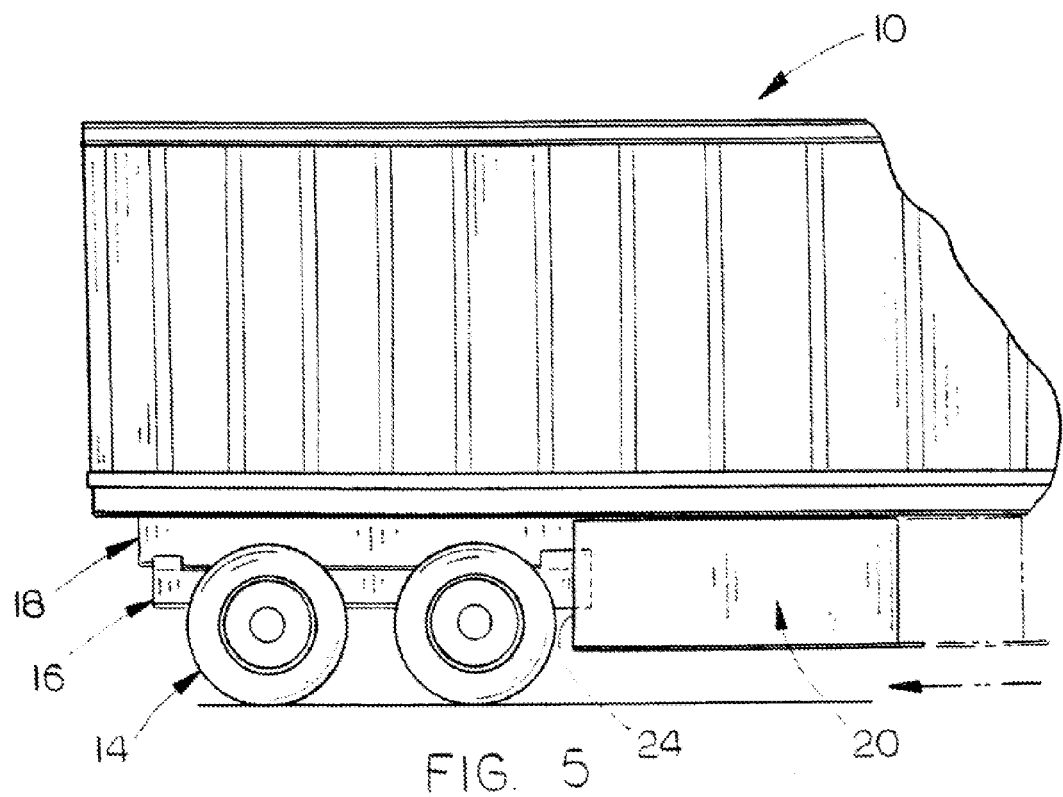
FIG. 5 is a view similar to FIG. 4 except that the slider axle and drag reduction device have been moved rearwardly from the position of FIG. 4.
Figure 6:
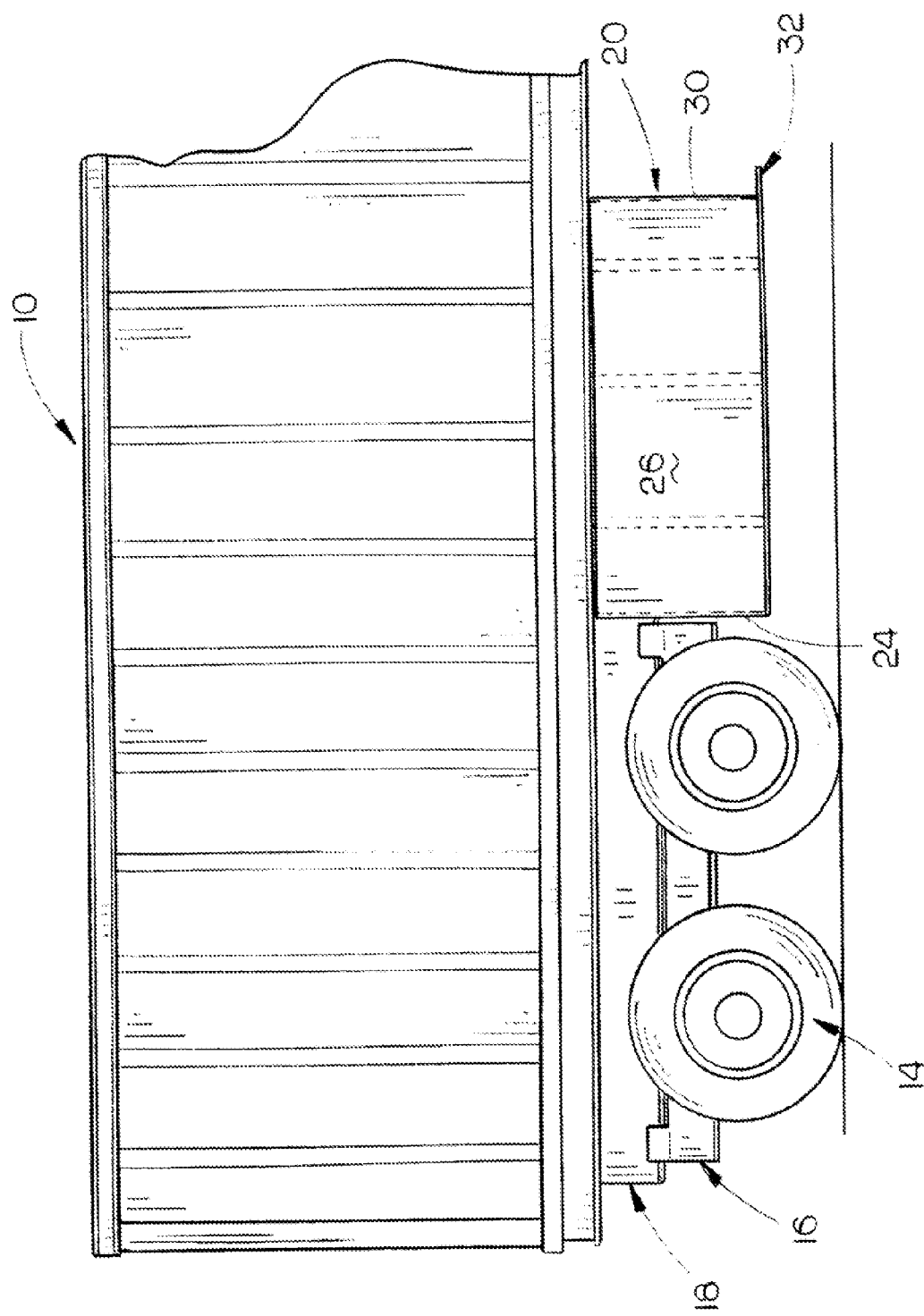
FIG. 6 is a side view illustrating the slider axle in its rearward position and the drag reduction device of this invention having been moved therewith.

The numeral 10 refers to a conventional semi-trailer having an underside generally referred to by the reference numeral 12. Trailer 10 includes a rear trailer wheel assembly 14 which is normally of the tandem axle type although the rear trailer wheel assembly could be of the single axle style. The rear trailer wheel assembly 14 may be fixed to the frame of the trailer or may be slidably longitudinally mounted on the frame of the trailer such as illustrated in FIGS. 4-6. As seen in FIGS. 4-6, the rear trailer wheel assembly includes a slider assembly 16 which is slidably movably mounted on the trailer frame means 18.

Figure 1:
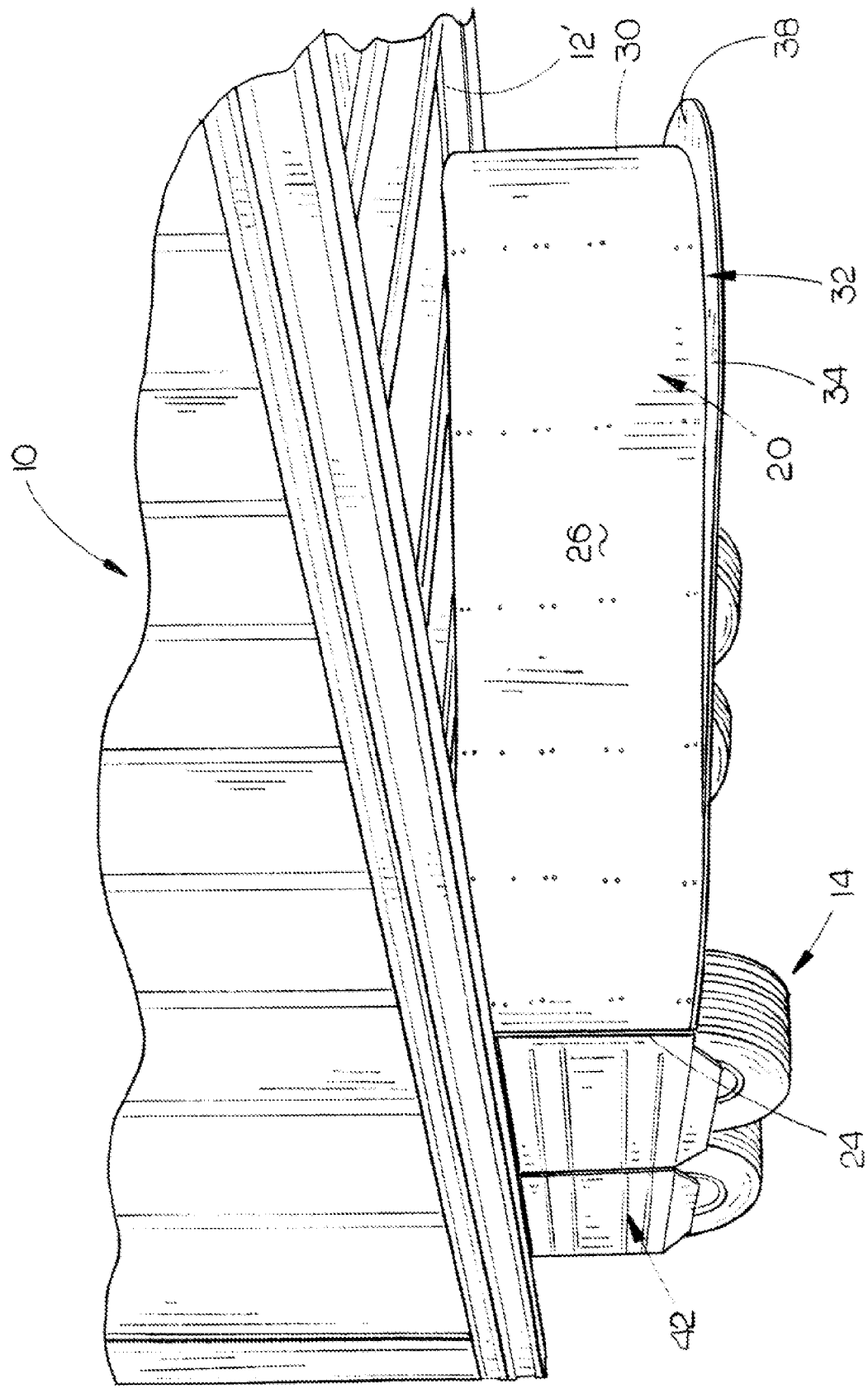
FIG. 1 is a perspective view of the aerodynamic drag reduction device of this invention secured to the underside of the trailer which is partially shown.

The numeral 20 refers to the drag reduction device of this invention which is either attached to the underside 12 of the trailer 10 forwardly of the rear trailer wheel assembly 14 as seen in FIG. 1 or is attached to the forward end of the slider assembly 16 for movement therewith as seen in FIGS. 4-6. For purposes of description, device 20 will be described as having a forward end 22 and a rearward end 24. Device 20 includes a first upstanding side wall portion 26 which extends forwardly and inwardly from the rearward end 24 of the device 20 to the forward end 22 of the device 20. Device 20 also includes a second upstanding side wall portion 28 which extends forwardly and inwardly from the rearward end 24 of the device 20. The forward ends of side wall portions 26 and 28 are joined together at a rounded nose portion 30. The side wall portions 26 and 28 may be comprised of wall sections joined together or may be of one-piece construction.

Figure 2:
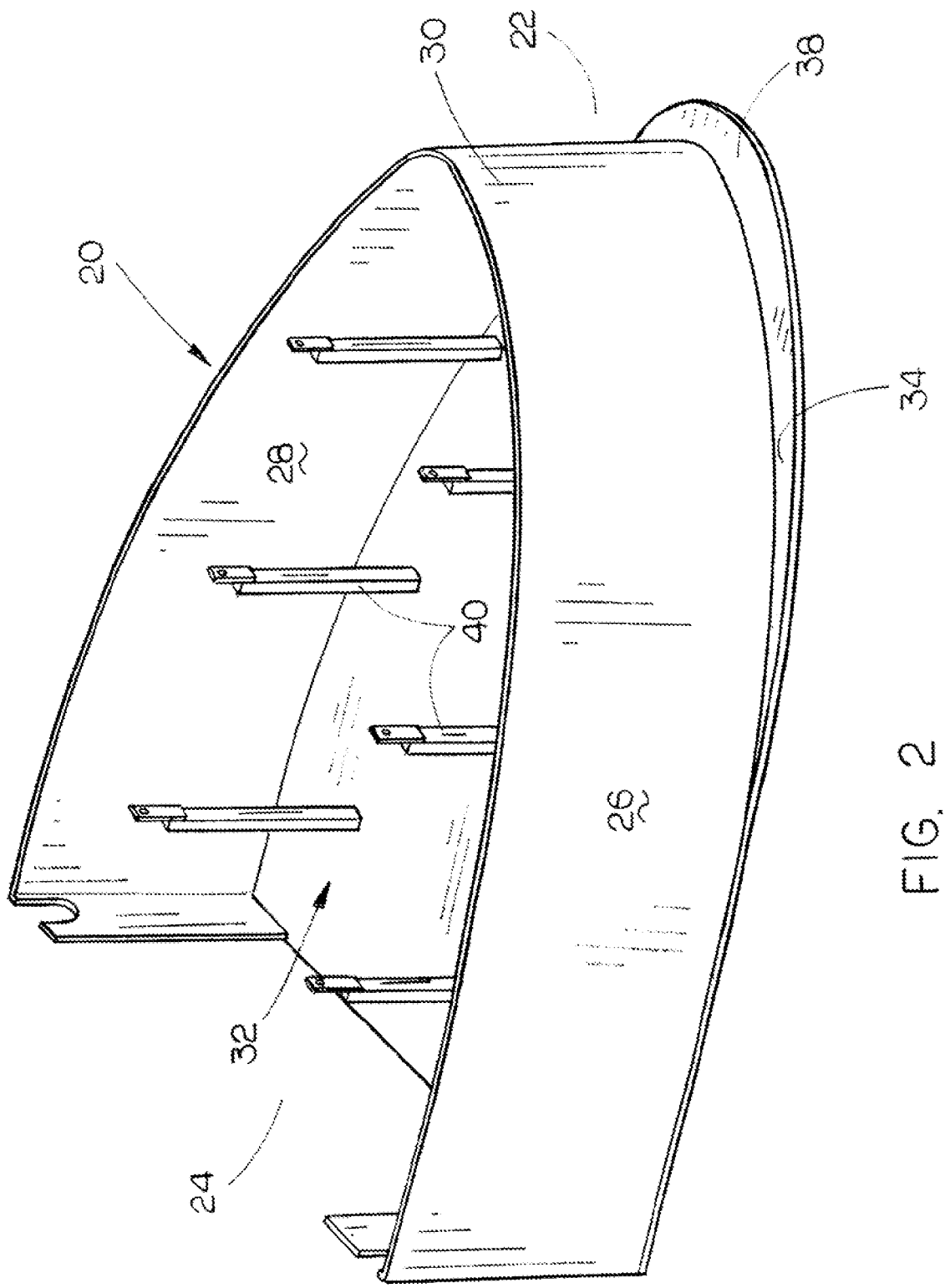
FIG. 2 is a perspective view of the aerodynamic drag reduction device of this invention.
Figure 3:
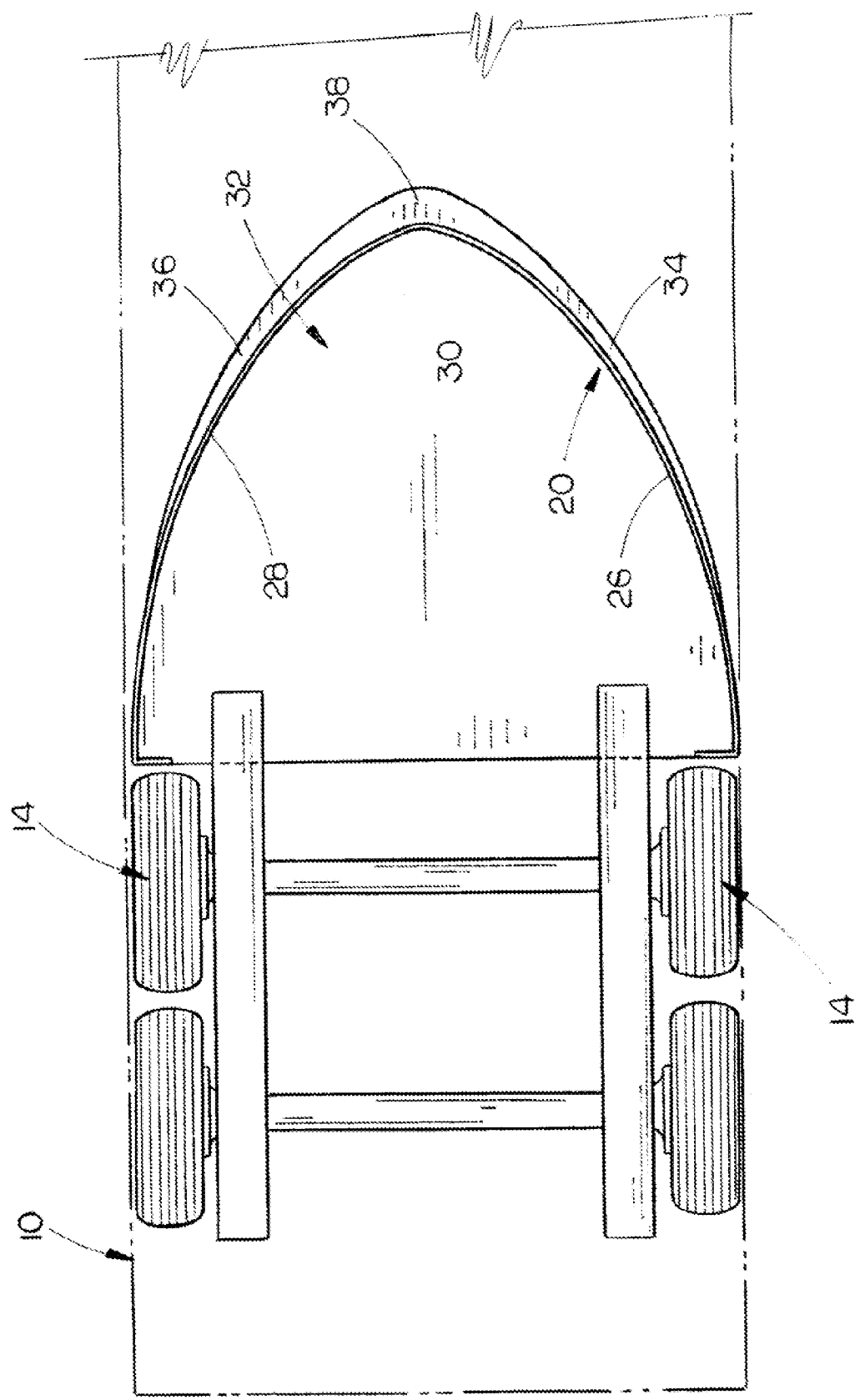
FIG. 3 is a top view of a drag reduction device mounted on the underside of a trailer.

Device 20 also includes a floor 32 which is secured to the lower ends of wall portions 26 and 28 and extends therebetween. Floor 32 is designed so that a floor portion 34 extends horizontally outwardly from side wall portion 26 and so that a floor portion 36 extends horizontally outwardly from side wall portion 28 and so that a floor portion 38 extends horizontally outwardly from nose portion 30. As seen in FIG. 3, the width of floor portion 34 gradually increases from its rearward end to its forward end and that the width of floor portion 36 gradually increases from its rearward end to its forward end. As seen in FIG. 2, the forward end of floor portion 38 is rounded.

A plurality of vertically disposed supports 40 are secured to floor 32 and extend upwardly therefrom. If the device 20 is being used on a trailer which does not have a sliding axle or slider assembly, the upper ends of supports 40 will be secured to the underside of the trailer so that the rearward end 24 of the device 20 is positioned closely to the forward side of the rear wheel assembly 14. If the device 20 is being used with a trailer which has a slider assembly, the device 20 will be secured to the slider assembly by any convenient means for longitudinal movement therewith the rearward end 24 of the device 20 being closely positioned adjacent the forward end of the wheel assembly 14. FIG. 4 illustrates the slider assembly 16 in a forward position while FIGS. 5 and 6 illustrate the slider assembly 16 in a rearward position.

It is preferred that a side shield assembly 42 is secured to the trailer 10 at each of the sides of the wheel assembly 14 to prevent air from impinging on the wheel assembly 14. If the trailer 10 does not have a slider assembly 16, the upper ends of the side shield assemblies 42 will be secured to the underside of the trailer 10. If the trailer has a slider assembly, the side shield assemblies will be secured to the slider assembly for longitudinal movement therewith. It is preferred that the side shield assemblies 42 at the device 20 be constructed of an aluminum material or plastic material.

In operation, as the trailer is being pulled over a highway or the like, the air flow at the underside of the trailer will impinge on the device 20 so that the air flow is directed outwardly and rearwardly to prevent the air flow from impinging on the wheel assembly 14 thereby decreasing the aerodynamic drag which would otherwise be experienced. As the air flow strikes the forward ends of side wall portions 26 and 28 and to nose portion 30, some of the air flow will be directed downwardly therefrom. However, the floor portions 34, 36 and 38 prevent the air flow from passing downwardly from those floor portions and will cause the downwardly air flow to be deflected rearwardly along the sides of the side wall portions 26 and 28.

The device 20 reduces the aerodynamic drag of the trailer 10 and therefore accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. An apparatus for reducing the aerodynamic drag of a trailer having a body with a forward end, a rearward end, opposite sides, an underside and a rear wheel assembly supporting the body from the underside thereof, comprising:

a drag reduction device including a generally U-shaped, upstanding air deflector wall means;

said wall means including a first side wall portion having a rearward end, a forward end, an upper end and a lower end;

said first side wall portion extending forwardly and inwardly in a generally curved manner from its rearward end to its forward end;

said wall means also including a second side wall portion having a rearward end, a forward end, an upper end and a lower end;

said second side wall portion extending forwardly and inwardly in a generally curved manner from its rearward end to its forward end;

said forward ends of said first and second side wall portions being joined together to form a rounded nose portion;

and a horizontally extending floor, having forward and rearward ends, secured to said lower ends of said first and second side-wall portions and extending therebetween;

said device being positioned beneath the underside of a trailer so that the rearward ends of said first and second side wall portions are positioned adjacent the forward end of the rear wheel assembly whereby air flow impinging on said wall means and be deflected outwardly of the rear wheel assembly;

said floor including portions thereof which extend outwardly from said first and second wall portions and said nose portion.

2. An apparatus for reducing the aerodynamic drag of a tractor having a body with a forward end, a rearward end, opposite sides, an underside, a rear wheel assembly supporting the body from the underside thereof and a longitudinally movable wheel slider assembly, comprising:

a drag reduction device including a generally U-shaped, upstanding air deflector wall means;

said wall means including a first side wall portion having a rearward end, a forward end, an upper end and a lower end;

said first side wall portion extending forwardly and inwardly in a generally curved manner from its rearward end to its forward end;

said wall means also including a second side wall portion having a rearward end, a forward end, an upper end and a lower end;

said second side wall portion extending forwardly and inwardly in a generally curved manner from its rearward end to its forward end;

said forward ends of said first and second side wall portions being joined together to form a rounded nose portion;

and a horizontally extending floor, having forward and rearward ends, secured to said lower ends of said first and second side wall portions and extending therebetween;

said device being positioned beneath the underside of a trailer so that the rearward ends of said first and second side wall portions are positioned adjacent the forward end of the rear wheel assembly whereby air flow impinging on said wall means and be deflected outwardly of the rear wheel assembly;

said floor including portions thereof which extend outwardly from said first and second wall portions and said nose portion;

said drag reduction device being operatively secured to the wheel slider assembly for longitudinal movement therewith.

* * * * *